US012561119B2

(12) United States Patent
Chatarasi et al.

(10) Patent No.: US 12,561,119 B2
(45) Date of Patent: Feb. 24, 2026

(54) LIVE RANGE REDUCTION TO ENHANCE REGISTER ALLOCATION OF STRUCTURED CONTROL FLOW PROGRAMS

(71) Applicant: International Business Machines Corporation, Armonk, NY (US)

(72) Inventors: Prasanth Chatarasi, White Plains, NY (US); Wei Wang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 18/461,030

(22) Filed: Sep. 5, 2023

(65) Prior Publication Data

US 2025/0077205 A1    Mar. 6, 2025

(51) Int. Cl.
*G06F 8/41* (2018.01)

(52) U.S. Cl.
CPC ............ *G06F 8/4441* (2013.01); *G06F 8/441* (2013.01)

(58) Field of Classification Search
None
See application file for complete search history.

(56) References Cited

U.S. PATENT DOCUMENTS

| | | | | | |
|---|---|---|---|---|---|
| 5,659,754 | A | * | 8/1997 | Grove | G06F 8/433 |
| | | | | | 717/146 |
| 6,016,398 | A | * | 1/2000 | Radigan | G06F 8/441 |
| | | | | | 717/152 |

| | | | | | |
|---|---|---|---|---|---|
| 6,090,156 | A | | 7/2000 | MacLeod | |
| 6,301,704 | B1 | * | 10/2001 | Chow | G06F 8/443 |
| | | | | | 717/146 |
| 7,389,501 | B1 | * | 6/2008 | Farouki | G06F 8/441 |
| | | | | | 717/154 |
| 9,489,180 | B1 | * | 11/2016 | Baskaran | G06F 8/443 |
| 9,830,133 | B1 | * | 11/2017 | Baskaran | G06F 8/453 |

(Continued)

FOREIGN PATENT DOCUMENTS

WO        2025/051474 A1     3/2025

OTHER PUBLICATIONS

A. Ketterlin and P. Clauss, "Recovering the Memory Behavior of Executable Programs," 2010 10th IEEE Working Conference on Source Code Analysis and Manipulation, Timisoara, Romania, 2010, pp. 189-198, (Year: 2010).*

(Continued)

*Primary Examiner* — Jason D Mitchell

(74) *Attorney, Agent, or Firm* — Yee & Associates, P.C.

(57)        ABSTRACT

Reducing live range of variables for register allocation of structured control-flow programs is provided. The method comprises defining an affine expression for each static single assignment (SSA) variable contained in an input program for a computer compiler. The affine expression of a SSA variable in the input program is derived by substitution of affine expressions of input operands involved in computation of the SSA variable. The method defines dependence edges between nodes representing the SSA variables in a dependence graph, wherein source and destination of dependence edges represent definition and use of the SSA variables. The method identifies one or more overlapping dependence edges with a same source among the dependence edges and eliminates the longer of the overlapping dependence edges according to the derived affine expressions.

22 Claims, 7 Drawing Sheets

500

START

502 — DEFINE AN AFFINE EXPRESSION FOR EACH STATIC SINGLE ASSIGNMENT (SSA) VARIABLE CONTAINED IN AN INPUT PROGRAM FOR A COMPUTER COMPILER

504 — DERIVE THE AFFINE EXPRESSION OF A SSA VARIABLE IN THE INPUT PROGRAM BY SUBSTITUTION OF AFFINE EXPRESSIONS OF INPUT OPERANDS INVOLVED IN COMPUTATION OF THE SSA VARIABLE

506 — DEFINE DEPENDENCE EDGES BETWEEN NODES REPRESENTING THE SSA VARIABLES IN A DEPENDENCE GRAPH, WHEREIN SOURCE AND DESTINATION OF DEPENDENCE EDGES REPRESENT DEFINITION AND USE OF THE SSA VARIABLES

508 — IDENTIFY ONE OR MORE OVERLAPPING DEPENDENCE EDGES WITH A SAME SOURCE AMONG THE DEPENDENCE EDGES

510 — ELIMINATE THE LONGER OF THE OVERLAPPING DEPENDENCE EDGES ACCORDING TO THE DERIVED AFFINE EXPRESSIONS

END

(56) References Cited

U.S. PATENT DOCUMENTS

| | | | | |
|---|---|---|---|---|
| 2007/0079303 | A1* | 4/2007 | Du | G06F 8/451 |
| | | | | 717/149 |
| 2010/0211937 | A1* | 8/2010 | Barik | G06F 8/441 |
| | | | | 717/136 |
| 2017/0351497 | A1* | 12/2017 | Ramani | G06F 8/4441 |
| 2019/0278575 | A1* | 9/2019 | Tiotto | G06F 8/452 |
| 2019/0278593 | A1* | 9/2019 | Elango | G06F 9/30065 |
| 2019/0384606 | A1* | 12/2019 | Panda | G06F 9/3455 |
| 2021/0132920 | A1* | 5/2021 | Mallon | G06F 21/14 |
| 2021/0149673 | A1* | 5/2021 | Li | G06F 9/30101 |
| 2025/0117945 | A1* | 4/2025 | Baughman | G06T 7/11 |

OTHER PUBLICATIONS

Balakrishnan, et al., "Splitting and Shrinking Live Ranges," CS 701 Project 4, Fall 2001, 14 pages, University of Wisconsin-Madison, accessed Aug. 4, 2023, https://pages.cs.wisc.edu/~saisanth/papers/liverange.ps.

Budimlic et al., "Fast Copy Coalescing and Live-Range Identification," ACM Sigplan Notices 37, No. 5, 2002, 8 pages, accessed Aug. 4, 2023, https://dl.acm.org/doi/abs/10.1145/543552.512534.

Cooper et al., "Live Range Splitting in a Graph Coloring Register Allocator," Compiler Construction, 1998, pp. 174-187, vol. 1383, accessed Aug. 4, 2023, https://link.springer.com/chapter/10.1007/BFb0026430.

Park, et al., "Optimistic Register Coalescing," ACM Transactions on Programming Languages and Systems, vol. 26, Issue 4, pp. 735-765, accessed Aug. 4, 2023, https://doi.org/10.1145/1011508.1011512.

Baev Ivan D et al: "Prematerialization: Reducing register pressure for free", 2006 International Conference on Parallel Architectures and Compilation Techniques (PACT) , ACM, Sep. 16, 2006 (Sep. 16, 2006), pp. 285-294, XP033061449, DOI: 10.1145/1152154.1152197 [retrieved on Feb. 8, 2017].

Johannes Doerfert et al: "Polyhedral expression propagation", Compiler Construction, ACM, 2 Penn Plaza, Suite 701New YorkNY 10121-0701 USA, Feb. 24, 2018 (Feb. 24, 2018), pp. 25-36, XP058384614, DOI: 10.1145/3178372.3179529 ISBN: 978-1-4503-5644-2.

PCT International Search Report and Written Opinion, dated Oct. 30, 2024, regarding Application No. PCT/EP2024/072233, 15 pages.

Takuya Nakaike et al: "Profile-based global live-range splitting", Proceedings of The 2006 ACM SIGPLAN Conference on Programming Language Design and Implementation: Jun. 10-16, 2006, Ottawa, Ontario, Canada; [ACM SIGPLAN Notices; 1.2005,6], Assoc. for Computing Machinery, New York, NY, Jun. 11, 2006 (Jun. 11, 2006), pp. 216-227, XP058302848, DOI: 10.1145/1133981.1134007 ISBN: 978-1-59593-320-1.

* cited by examiner

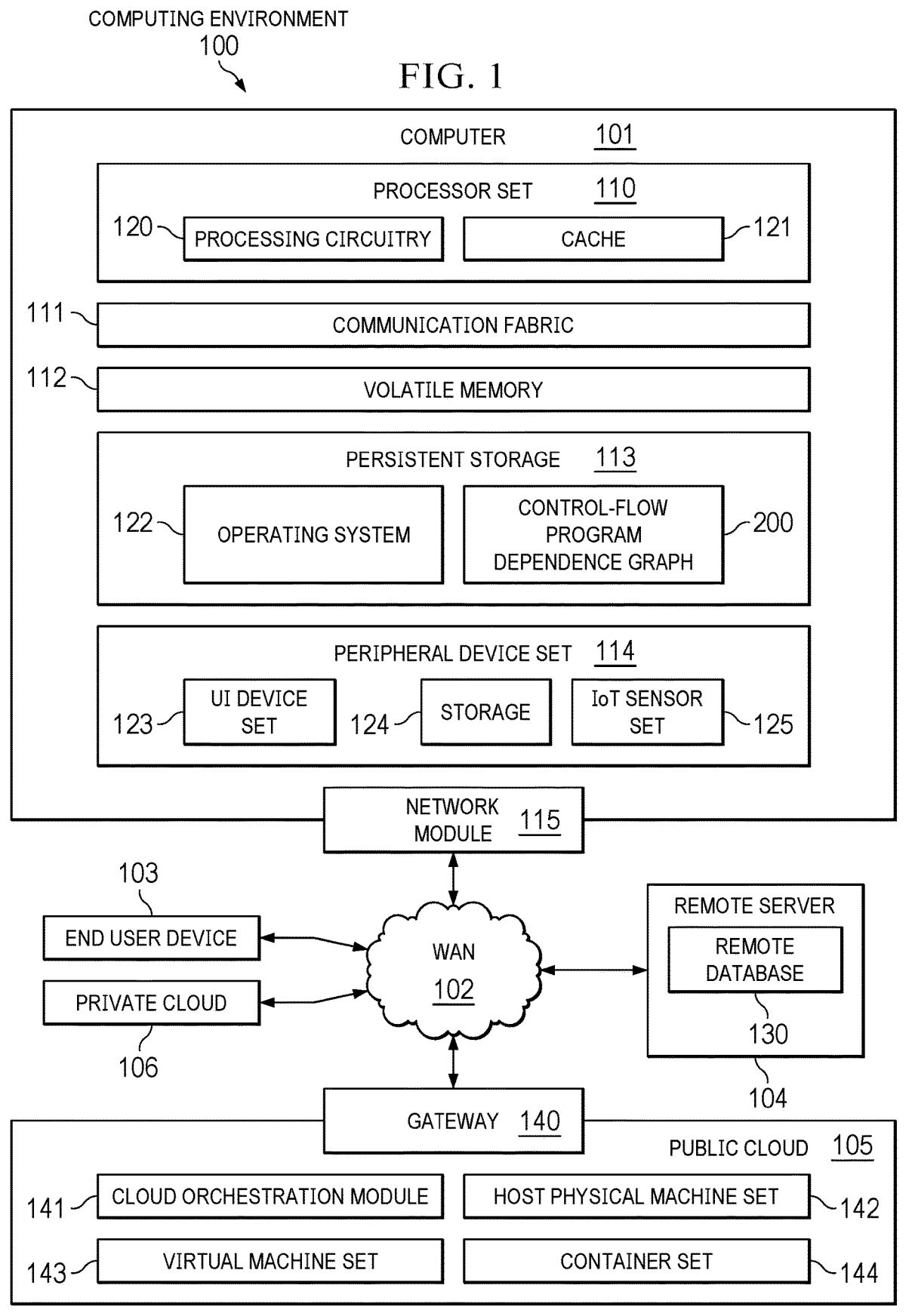

COMPUTING ENVIRONMENT
100

FIG. 1

COMPUTER          101

PROCESSOR SET          110

120 — PROCESSING CIRCUITRY          CACHE — 121

111 — COMMUNICATION FABRIC

112 — VOLATILE MEMORY

PERSISTENT STORAGE          113

122 — OPERATING SYSTEM

CONTROL-FLOW PROGRAM DEPENDENCE GRAPH — 200

PERIPHERAL DEVICE SET          114

123 — UI DEVICE SET          124 — STORAGE          IoT SENSOR SET — 125

NETWORK MODULE          115

103

END USER DEVICE

PRIVATE CLOUD

106

WAN          102

REMOTE SERVER

REMOTE DATABASE

130

104

GATEWAY          140

PUBLIC CLOUD          105

141 — CLOUD ORCHESTRATION MODULE          HOST PHYSICAL MACHINE SET — 142

143 — VIRTUAL MACHINE SET          CONTAINER SET — 144

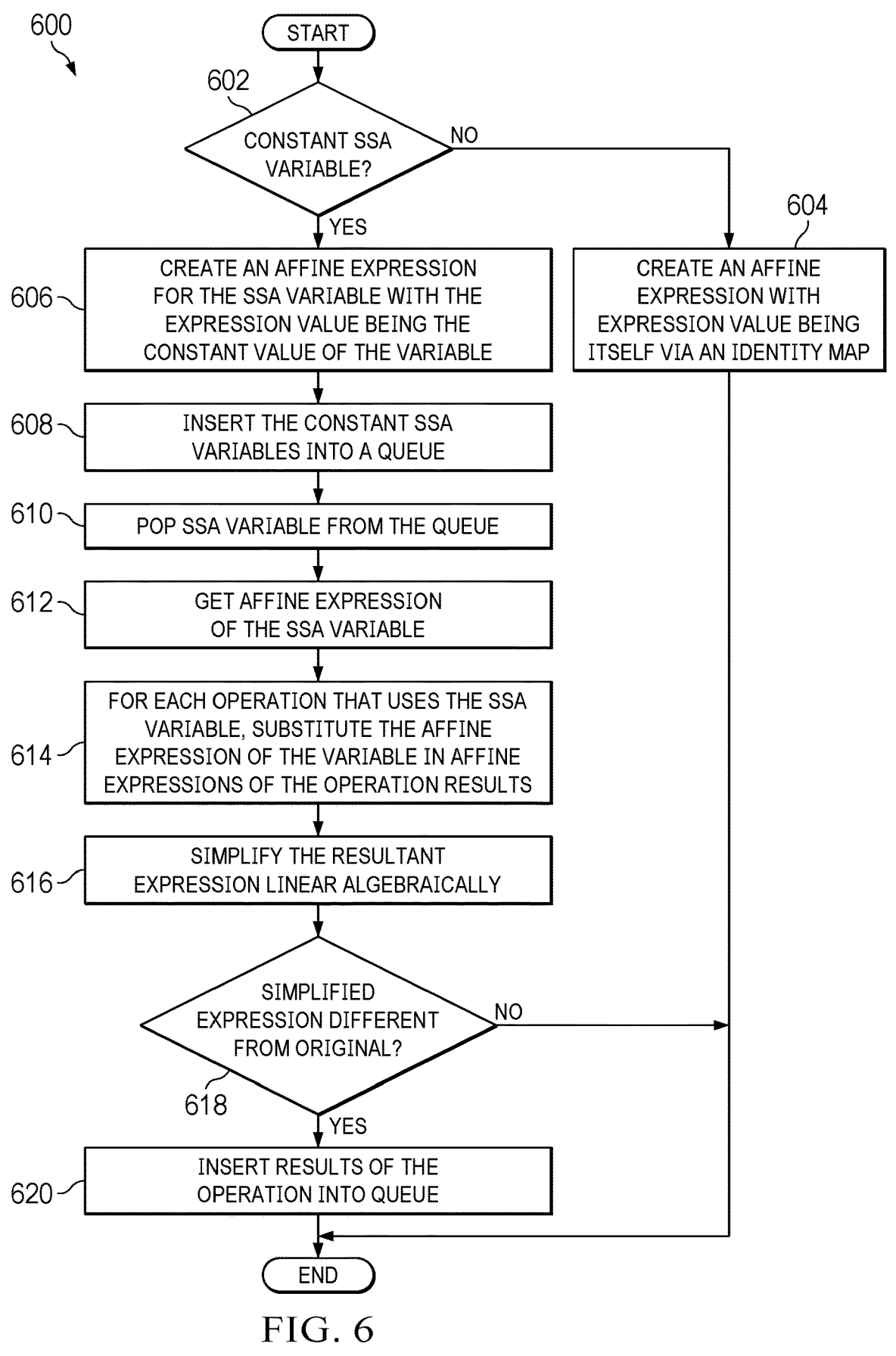

600

START

602

CONSTANT SSA VARIABLE?

NO

604

YES

606 — CREATE AN AFFINE EXPRESSION FOR THE SSA VARIABLE WITH THE EXPRESSION VALUE BEING THE CONSTANT VALUE OF THE VARIABLE

CREATE AN AFFINE EXPRESSION WITH EXPRESSION VALUE BEING ITSELF VIA AN IDENTITY MAP

608 — INSERT THE CONSTANT SSA VARIABLES INTO A QUEUE

610 — POP SSA VARIABLE FROM THE QUEUE

612 — GET AFFINE EXPRESSION OF THE SSA VARIABLE

614 — FOR EACH OPERATION THAT USES THE SSA VARIABLE, SUBSTITUTE THE AFFINE EXPRESSION OF THE VARIABLE IN AFFINE EXPRESSIONS OF THE OPERATION RESULTS

616 — SIMPLIFY THE RESULTANT EXPRESSION LINEAR ALGEBRAICALLY

SIMPLIFIED EXPRESSION DIFFERENT FROM ORIGINAL?

NO

618

YES

620 — INSERT RESULTS OF THE OPERATION INTO QUEUE

END

FIG. 6

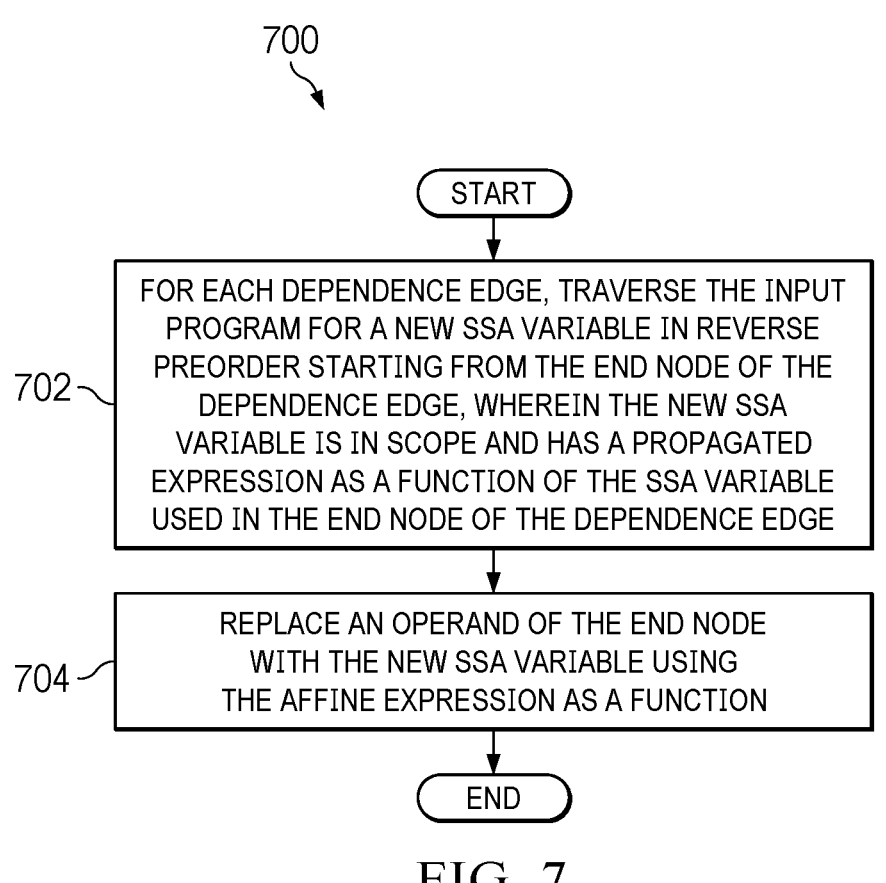

700

START

FOR EACH DEPENDENCE EDGE, TRAVERSE THE INPUT PROGRAM FOR A NEW SSA VARIABLE IN REVERSE PREORDER STARTING FROM THE END NODE OF THE DEPENDENCE EDGE, WHEREIN THE NEW SSA VARIABLE IS IN SCOPE AND HAS A PROPAGATED EXPRESSION AS A FUNCTION OF THE SSA VARIABLE USED IN THE END NODE OF THE DEPENDENCE EDGE

702

REPLACE AN OPERAND OF THE END NODE WITH THE NEW SSA VARIABLE USING THE AFFINE EXPRESSION AS A FUNCTION

704

END

FIG. 7

LIVE RANGE REDUCTION TO ENHANCE REGISTER ALLOCATION OF STRUCTURED CONTROL FLOW PROGRAMS

BACKGROUND

The present disclosure relates generally to an improved computing system, and more specifically to reducing required registers in a computer processor for structured control flow programs.

Register allocation is a process in a compiler for mapping variables in a program to physical registers in a computer's processor. Processors have finite register resources. It is the responsibility of the compiler to effectively map logical variables in a program to the registers according to a number of cost factors such as execution time, code size, and spilling storage. Register allocation commonly relies on live range analysis wherein if the number of live ranges exceeds the number of register resources of the processor the compiler performs spilling onto external memory (e.g., execution stack) to store and retrieve later. Some processors such as artificial intelligence based accelerators do not provide a mechanism to spill variables onto an execution stack.

SUMMARY

According to one illustrative embodiment, a computer-implement method performs reducing live range of variables for register allocation of structured control-flow programs. The method comprises defining an affine expression for each static single assignment (SSA) variable contained in an input program for a computer compiler. The affine expression of a SSA variable in the input program is derived by substitution of affine expressions of input operands involved in computation of the SSA variable. The method defines dependence edges between nodes representing the SSA variables in a dependence graph, wherein source and destination of dependence edges represent definition and use of the SSA variables. The method identifies one or more overlapping dependence edges with a same source among the dependence edges and eliminates the longer of the overlapping dependence edges according to the derived affine expressions. According to other illustrative embodiments, a computer system and a computer program product for reducing live range of variables for register allocation of structured control-flow programs are provided.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 1 depicts a pictorial representation of a computing environment in which illustrative embodiments may be implemented;

FIG. 6 depicts a flowchart illustrating a process for deriving affine expressions in accordance with an illustrative embodiment; and FIG. 7 depicts a flowchart illustrating a process for identifying overlapping dependence edges in accordance with an illustrative embodiment.

DETAILED DESCRIPTION

Figure 2:
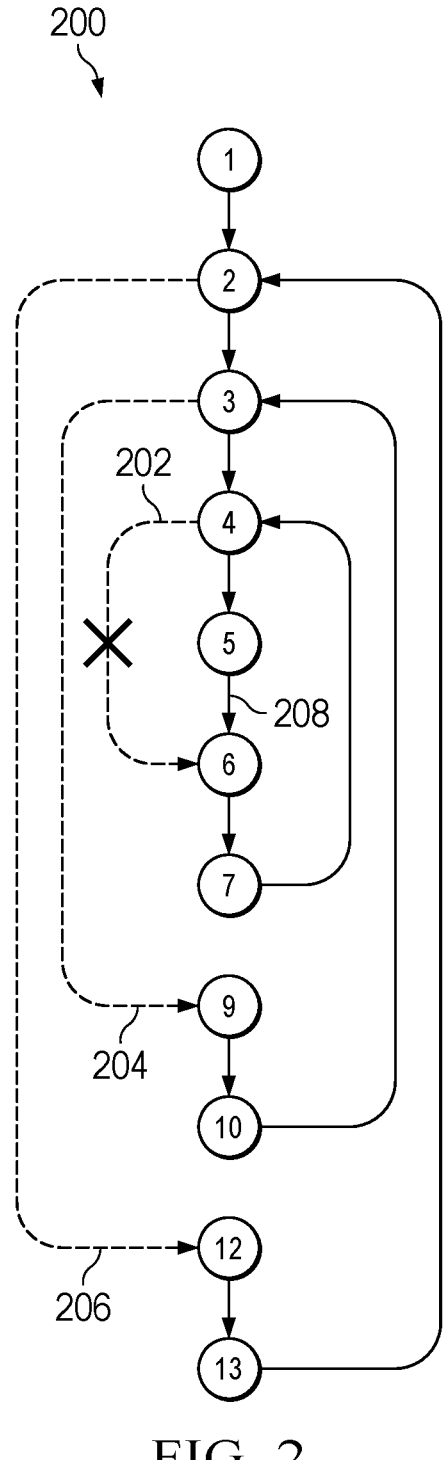
FIG. 2 depicts a dependence graph illustrating elimination of an overlap edge in accordance with an illustrative embodiment.

A computer-implemented method performs reducing live range of variables for register allocation of structured control-flow programs. A number of processors to perform defining an affine expression for each static single assignment (SSA) variable contained in an input program for a computer compiler. The number of processors derive the affine expression of a SSA variable in the input program by substitution of affine expressions of input operands involved in computation of the SSA variable. The number of processors define dependence edges between nodes representing the SSA variables in a dependence graph, wherein source and destination of dependence edges represent definition and use of the SSA variables. The number of processors identify one or more overlapping dependence edges with a same source among the dependence edges and eliminate the longer of the overlapping dependence edges according to the derived affine expressions. As a result, the illustrative embodiments provide a technical effect of reducing the number of required process registers for the structured control-flow program.

As part of deriving the affine expressions the number of processors create an affine expression for each constant SSA variable in the input program with the expression values being the constant value of those variables. For non-constant SSA variables in the input program, the number of processors create an affine expression with expression value being itself via an identity map. The number of processors insert the constant SSA variables into a queue, and for each SSA variable "v" in the queue: pop the SSA variable from the queue; get the affine expression of the popped SSA variable; for each operation that uses the SSA variable "v", substitute the affine expression of the variable "v" in affine expressions of the operation results; and simplify the resultant expression linear algebraically. As a result, the illustrative embodiments provide a technical effect of propagating affine expressions through the SSAs of the input program.

Responsive to a determination the simplified expression is different from the original expression before substitution, the number of processors insert the results of the operation into the queue. As a result, the illustrative embodiments provide a technical effect of inserting the results of changed expressions into the queue.

As part of substituting the affine expression of the variable "v" in affine expressions of the operation results for an operation comprising arithmetic, the number of processors construct the affine expression of the operation results according to the specific arithmetic involved. As a result, the illustrative embodiments provide a technical effect of constructing affine expressions for arithmetic operations.

As part of substituting the affine expression of the variable "v" in affine expressions of the operation results for an operation comprising a loop with operation results, the number of processors sum the affine expressions of the initial value of its corresponding loop-carried variable with the product of the number of loop iterations and the constant offset present in each iteration to form the result for each operation. As a result, the illustrative embodiments provide a technical effect of constructing affine expressions for program loops.

As part of substituting the affine expression of the variable "v" in affine expressions of the operation results for an operation that is unfamiliar or undefined, the number of processors abstain from substitution of the affine expression of the used variable, wherein the operation is considered unsolvable. As a result, the illustrative embodiments provide a technical effect of identifying unsolvable operations.

As part of identifying the one or more overlapping dependence edges, for each dependence edge, the number of processors traverse the input program for a new SSA variable in reverse preorder starting from the end node of the dependence edge, wherein the new SSA variable is in scope and has a propagated expression as a function of the SSA variable used in the end node of the dependence edge. The number of processors replace an operand of the end node with the new SSA variable using the affine expression as a function. As a result, the illustrative embodiments provide a technical effect of identifying overlapping dependence edges.

As a part of identifying the one or more overlapping dependence edges, responsive to a determination multiple SSA variables in reverse preorder could contribute to replacement of the operand, the number of processors find the closest SSA variable based on dominance. As a result, the illustrative embodiments provide a technical effect of finding the closest SSA variable.

As part of reducing live range of variables for register allocation of structured control-flow programs the number or processors combine the affine expressions into groups, wherein the affine expressions in each group are the same except for constant terms. As a result, the illustrative embodiments provide a technical effect of grouping affine expressions.

A computer-implemented method performs reducing live range of variables for register allocation of structured control-flow programs. A number of processors define an affine expression for each static single assignment (SSA) variable contained in an input program for a computer compiler. The number of processors substitute affine expressions of input operands involved in computation of the SSA variables into the SSA variables. The number of processors remove at least one overlapping dependence edge between nodes representing the SSA variables in a dependence graph according to the substitution of the affine expressions into the SSA variables, wherein each overlapping dependent edge represents a required register in a processor. As a result, the illustrative embodiments provide a technical effect of reducing the number of required process registers for the structured control-flow program.

As part of removing the at least one overlapping dependent edge, for each dependence edge, the number of processors traverse the input program for a new SSA variable in reverse preorder starting from the end node of the dependence edge, wherein the new SSA variable is in scope and has a propagated expression as a function of the SSA variable used in the end node of the dependence edge. The number of processors replace an operand of the end node with the new SSA variable using the affine expression as a function. As a result, the illustrative embodiments provide a technical effect of identifying overlapping dependence edges.

As part of removing the at least one overlapping dependent edge, responsive to a determination multiple SSA variables in reverse preorder could contribute to replacement of the operand, the number of processors find the closest SSA variable based on dominance. As a result, the illustrative embodiments provide a technical effect of finding the closest SSA variable.

A computer-implemented method performs reducing live range of variables for register allocation of structured control-flow programs. A number of processors create an affine expression for each constant static single assignment (SSA) variable in an input program for a computer compiler, wherein the expression values are the constant value of those variables. For non-constant SSA variables in the input program, the number of processors create an affine expression with expression value being itself via an identity map. The number of processors insert the constant SSA variables into a queue. For each SSA variable in the queue the number of processors: pop the SSA variable from the queue; get the affine expression of the popped SSA variable; for each operation that uses the SSA variable, substitute the affine expression of the variable in affine expressions of the operation results and simplifying the resultant expression linear algebraically; and responsive to a determination the simplified expression is different from the original expression before substitution, insert the results of the operation into the queue. The number of processors remove at least one overlapping dependence edge between nodes representing the SSA variables in a dependence graph according to the substitution of the affine expressions, wherein each overlapping dependent edge represents a required register in a processor. As a result, the illustrative embodiments provide a technical effect of reducing the number of required process registers for the structured control-flow program.

As part of the substituting the affine expression of the variable in affine expressions of the operation results, for an operation comprising arithmetic, the number of processors construct the affine expression of the operation results according to the specific arithmetic involved. For an operation comprising a loop with operation results, the number of processors sum the affine expressions of the initial value of its corresponding loop-carried variable with the product of the number of loop iterations and the constant offset present in each iteration. For an operation that is unfamiliar or undefined, the number of processors abstain from substitution of the affine expression of the used variable, wherein the operation is considered unsolvable. As a result, the illustrative embodiments provide a technical effect of substituting the affine expression of the variable in affine expressions of the operation results and identifying unsolvable operations.

A computer system comprises a storage device that stores program instructions and one or more processors operably connected to the storage device and configured to execute the program instructions to cause the system to define an affine expression for each static single assignment (SSA) variable contained in an input program for a computer compiler; derive the affine expression of a SSA variable in the input program by substitution of affine expressions of input operands involved in computation of the SSA variable; define dependence edges between nodes representing the SSA variables in a dependence graph, wherein source and destination of dependence edges represent definition and use of the SSA variables; identify one or more overlapping dependence edges with a same source among the dependence edges; and eliminate the longer of the overlapping dependence edges according to the derived affine expressions. As a result, the illustrative embodiments provide a technical effect of reducing the number of required process registers for the structured control-flow program.

As part of deriving the affine expressions the number of processors create an affine expression for each constant SSA variable in the input program with the expression values being the constant value of those variables. For non-constant SSA variables in the input program, the number of processors create an affine expression with expression value being itself via an identity map. The number of processors insert the constant SSA variables into a queue, and for each SSA variable "v" in the queue: pop the SSA variable from the queue; get the affine expression of the popped SSA variable; for each operation that uses the SSA variable "v", substitute the affine expression of the variable "v" in affine expressions of the operation results; and simplify the resultant expression linear algebraically. As a result, the illustrative embodiments provide a technical effect of propagating affine expressions through the SSAs of the input program.

Responsive to a determination the simplified expression is different from the original expression before substitution, the number of processors insert the results of the operation into the queue. As a result, the illustrative embodiments provide a technical effect of inserting the results of changed expressions into the queue.

As part of substituting the affine expression of the variable "v" in affine expressions of the operation results for an operation comprising arithmetic, the number of processors construct the affine expression of the operation results according to the specific arithmetic involved. As a result, the illustrative embodiments provide a technical effect of constructing affine expressions for arithmetic operations.

As part of substituting the affine expression of the variable "v" in affine expressions of the operation results for an operation comprising a loop with operation results, the number of processors sum the affine expressions of the initial value of its corresponding loop-carried variable with the product of the number of loop iterations and the constant offset present in each iteration to form the result for each operation. As a result, the illustrative embodiments provide a technical effect of constructing affine expressions for program loops.

As part of substituting the affine expression of the variable "v" in affine expressions of the operation results for an operation that is unfamiliar or undefined, the number of processors abstain from substitution of the affine expression of the used variable, wherein the operation is considered unsolvable. As a result, the illustrative embodiments provide a technical effect of identifying unsolvable operations.

As part of identifying the one or more overlapping dependence edges, for each dependence edge, the number of processors traverse the input program for a new SSA variable in reverse preorder starting from the end node of the dependence edge, wherein the new SSA variable is in scope and has a propagated expression as a function of the SSA variable used in the end node of the dependence edge. The number of processors replace an operand of the end node with the new SSA variable using the affine expression as a function. As a result, the illustrative embodiments provide a technical effect of identifying overlapping dependence edges.

As a part of identifying the one or more overlapping dependence edges, responsive to a determination multiple SSA variables in reverse preorder could contribute to replacement of the operand, the number of processors find the closest SSA variable based on dominance. As a result, the illustrative embodiments provide a technical effect of finding the closest SSA variable.

As part of reducing live range of variables for register allocation of structured control-flow programs the number or processors combine the affine expressions into groups, wherein the affine expressions in each group are the same except for constant terms. As a result, the illustrative embodiments provide a technical effect of grouping affine expressions.

A computer program product performs reducing live range of variables for register allocation of structured control-flow programs. A persistent storage medium having program instructions configured to cause one or more processors to: define an affine expression for each static single assignment (SSA) variable contained in an input program for a computer compiler; derive the affine expression of a SSA variable in the input program by substitution of affine expressions of input operands involved in computation of the SSA variable; define dependence edges between nodes representing the SSA variables in a dependence graph, wherein source and destination of dependence edges represent definition and use of the SSA variables; identify one or more overlapping dependence edges with a same source among the dependence edges; and eliminate the longer of the overlapping dependence edges according to the derived affine expressions. As a result, the illustrative embodiments provide a technical effect of reducing the number of required process registers for the structured control-flow program.

As part of deriving the affine expressions the number of processors create an affine expression for each constant SSA variable in the input program with the expression values being the constant value of those variables. For non-constant SSA variables in the input program, the number of processors create an affine expression with expression value being itself via an identity map. The number of processors insert the constant SSA variables into a queue, and for each SSA variable "v" in the queue: pop the SSA variable from the queue; get the affine expression of the popped SSA variable; for each operation that uses the SSA variable "v", substitute the affine expression of the variable "v" in affine expressions of the operation results; and simplify the resultant expression linear algebraically. As a result, the illustrative embodiments provide a technical effect of propagating affine expressions through the SSAs of the input program.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium May be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to the figures, and in particular, with reference to FIG. 1, a diagram of a data processing environment is provided in which illustrative embodiments may be implemented. It should be appreciated that FIG. 1 is only meant as an example and are not intended to assert or imply any limitation with regard to the environments in which different embodiments may be implemented. Many modifications to the depicted environment may be made.

FIG. 1 depicts a pictorial representation of a computing environment in which illustrative embodiments may be implemented. Computing environment 100 contains an example of an environment for the execution of at least some of the computer code involved in performing the inventive methods, such as control-flow program dependence graph 200. In addition to control-flow program dependence graph 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and control-flow program dependence graph 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/ or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in control-flow program dependence graph 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface-type operating systems that employ a kernel. Control-flow program dependence graph instructions included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account that register allocation commonly relies on live range analysis wherein if the number of live ranges exceeds the number of register resources of the processor the compiler performs spilling onto external memory to store and retrieve later.

The illustrative embodiments also recognize and take into account that some processors such as AI-based accelerators do not provide a mechanism to spill variables onto an execution stack. Register allocation becomes more critical where spilling is not provided by the hardware.

The illustrative embodiments provide a pre-processing transformation before register allocation to reduce live range pressure encounter during register allocation. The illustrative embodiments employ expression propagation and structure control flow intermediate representation to caser register allocation pressure.

Structured control flow refers to a programming concept where the flow of control to a block or region is based on single-entry and single-exit (SESE) methodology. During execution, the execution of the (structured) statement starts from one defined point, and the execution terminates at one defined point. This concept discourages the use of "goto", "labels", and "switches" in C-based programming languages. SESE methodology also helps organize and simplify the flow of control in programs, making them easier to read, understand, maintain, and debug. Furthermore, it helps to optimize the generated code and improve program performance.

The example program below is an example of structured control flow using SSA-based (Static Single Assignment) representation. SSA is a programming language intermediate representation used internally by a compiler to represent source code. SSA requires that each variable is only defined once to enable easier tracking of values in a program and simplifying dataflow analysis. The compiler translates source code written in a high-level programing language (human-readable instructions) into a low-level programming language such as machine code that can be executed directly by a computer processor. A structured control flow for a program provides the order in which individual statements and instructions are executed or evaluated as well as which of two or more possible paths to follow.

Example Program 1:

```
Line01: %1 = ..
Line02: %2 = for (i-loop: %a to %b ) (%arg1 = %1) {
Line04:     %3 = if (%arg1 > %j-loop) {
Line05:         %4 = .....
Line06:         yield %4
Line07:     } else {
Line08:         %5 = ...
Line09:     yield %5
Line10:  }
Line11:  %6= .... //f(%arg2, %3);
Line12:  yield %6
Line13: }
```

The example program above does not have arbitrary entry to a region and arbitrary exit to any regions from a given point. Phi nodes (definitions coming from multiple control points) in loops are captured using iterator arguments (e.g., arg1 initial values is % 1, the next value is % 6, and the final, exit value is % 2). Phi nodes from conditionals are captured as results (e.g., % 3 value is either % 4 or % 5 depending on the branch taken).

The illustrative embodiments employ live range reduction to reduce live ranges of variables in a program by deriving the value of an SSA variable (e.g., S1) with near-by SSA variable such that S1's live range is reduced. This approach is applicable to control flow programs with SSA-based representation and is particularly helpful in high energy-efficiency domain-specific accelerators where registers are very limited (e.g., only one register) and therefore no support for a spilling mechanism.

The following is an example program that can be transformed so as to require only a single register using the approach of the illustrative embodiments.

Example Program 2:

```
Line01: %1 = 0
Line02: for (%arg4 = Ckj ) (%arg1 = %1) {
Line03:   %6 = for (%arg5 = Ci) (%arg2 = %arg1) {
Line04:     %4 = for (%arg6 = Cj) (%arg3 = %arg2) {
Line05:       %2 = LoadAndSend %Memory[%arg3]
Line06:       %3 = %arg3 + 128
Line07:       yield %3
Line08:     }
Line09:     %5 = %arg2 + c0
Line10:     yield %5
Line11:   }
Line12:   %7 = %arg1 + c1
Line13:   yield %7
Line14:}
```

Ckj, Ci, Cj, c0 and c2 are constant values. % arg1, % arg2, and % arg3 are for-loop's iterate arguments (aka loop carried variables). % arg4, % arg5, and % arg6 are for-loop's loop iterators. LoadAndSend is an exemplary operation of reading data from memory at a specific address (e.g., % arg3), and the return value can indicate the original address value or modified address value depending on the operation. In the above example, % 2 is the same as % arg3. In the case of an update mode, % 2 would be % arg3+size of load.

For Example Program 2 above, the variables' live ranges overlap.

| SSA Live Range (def- last use): | | | |
|---|---|---|---|
| %arg1: 2 ---------------------12 | | | assigned to R0 |
| %arg2: 3 --------9 | | | assigned to R1 |
| %arg3: 4-6 | | | assigned to R2 |
| %2: 5 | | | not assigned |
| %3: 6-7 | | | assigned to R2 |
| %4: 8 | | | not assigned |
| %5: 9-10 | | | assigned to R2 |
| %6: 11 | | | not assigned |
| %7: 12-13. | | | assigned to R2 |

As shown above, the live range for % arg1 overlaps all other variables' live ranges except % 7. In the above example, extra registers need to be allocated for variables whose live ranges overlap, requiring a total of three registers.

The pre-processing transformation of the illustrative embodiments begins by computing affine expressions for each of the SSA variables in the input program. The process then performs live range reduction by deriving the values of an SSA variable with near-by SSA variables, thereby leveraging the information from the affine expressions.

For the following example expressions:

$$A = D + C;$$

$$B = A - C$$

affine expression propagation would be written as:

$$B = D + C - C;$$

$$= D$$

where the definition of A is substituted into (propagated) the definition of B.

Affine expression propagation maintains an affine expression for each SSA variable as a function of previously defined SSA variables. For example:

$$A = D + C; \rightarrow \text{map}(A) = \text{map} < (d0, d1) \rightarrow (d0 + d1) > [d0 = D, d1 = C]$$

$$B = A - C; \rightarrow \text{map}(A) = \text{map} < (d0, d1) \rightarrow (d0 - d1 + d1) >$$

$$[d0 = D, d1 = C]$$

$$= \text{map} < (d0, d1) \rightarrow (d0) > [d0 = D]$$

If a variable cannot be captured (e.g., function results, if condition results) using an affine expression over previously defined variables, then the affine expression is simply an identity expression over itself:

```
A = if (....) {
    yield B;
} else {
    yield C;
}
expression_map(A) = map <(d0) -> (d0)> [d0 = A]
```

After propagating the affine expressions, the process proceeds to loop-exit analysis. The results of a for-loop operation can also be expressed as an affine function over the previously defined SSA variables:

```
%t5 = for %arg0 = 0 to %c1 iter_arg(%arg1 = %t1) {
    %t3= %arg1+ 128;

....
    %t4 = %t3 + 256;
    yield %t4;
}
map(t3) = map< (d0) → (d0 + 128)> [d0 = arg1]
map(t4) = map< (d0) → (d0 + 128 + 256)> [d0 = arg1]
map(t5) = map< (d0, d1) → (d0+d1 * (128 + 256))> [d0=t1, d1=c1]
map(arg1) = map< (d0, d1) → (d0 + d1* (128+256))> [d0=t1, d1=arg0]
```

As long as either loop bounds are static, or offset along the loop is a constant, affine expressions can represent the results of loop. This assumption holds true for many AI workloads.

The algorithm for affine expression propagation begins by creating an affine expression map for each SSA variable definition. For example, for the SSA variable definition % 1=%2+%3:

```
AffineMap: %1 − ( (d0, d1) → (d0 + d1)]
Arguments: d0 = %2, d1 = %3
As another example, for the SSA variable definition %1 = 100
AffineMap: %1 − ( ( ) → (100)]
Arguments: none
```

For the SAA variable definition % 1=ops whose results can be expressed as an affine function of its inputs (e.g., if-conditions return values):

```
AffineMap: %1 − ( (d0) → (d0)] (Identify map)
Arguments: %1 = %1
```

To propagate, the algorithm initializes a queue-based worklist based on the above initialization. A variable is the popped from the queue. If there are no input operands to the operation that produces that variable, it is skipped. For each input operand of the operation that produces the variable, the operand map is substituted into the operation map and simplified. If substitution results in a change, the variable is updates and pushed onto the queue.

For Example Program 2 above, the propagated expressions are:

```
%arg1 = c1 * %arg4
%arg2 = c0 * %arg5 + c1 * %arg4
%arg3 = 128 * %arg6 + c0 * %arg5 + c1 * %arg4
%2 = 128 * %arg6 + c0 * %arg5 + c1 * %arg4
%3 = 128 * %arg6 + c0 * %arg5 + c1 * %arg4 + 128
%4 = 128 * Cj + c0 * %arg5 + c1 * %arg4
%5 = c0 * %arg5 + c1 * %arg4 + c0
%6 = c0 * Ci + c1 * %arg4
%7 = c1 * %arg4 + c1
```

Expressions of all variables after propagation are affine expressions of loop iterators. Some variables' expressions are almost the same except the constant terms (e.g., % arg1, % 6, % 7).

Affine expressions that are the same except for constant terms can be grouped into expression groups. Continuing the example above:

```
Group 1:
%arg1    = c1 * %arg4
%6       = c1 * %arg4 + c0 * Ci
%7       = c1 * %arg4 + c1
Group 2:
%arg3    = 128 * %arg6 + c0 * %arg5 + c1 * %arg4
%2       = 128 * %arg6 + c0 * %arg5 + c1 * %arg4
%3       = 128 * %arg6 + c0 * %arg5 + c1 * %arg4 + 128
Group 3:
%4       = c0 * %arg5 + c1 * %arg4 + 128 * Cj
%5       = c0 * %arg5 + c1 * %arg4 + c0
%arg2    = c0 * %arg5 + c1 * %arg4
```

For variables within an expression group, it is possible to use one variable to represent another one. For example, % arg1, % 6 and % 7 contain the same variable, % arg4, in their expression. Therefore, it is possible to deduce an expression using one variable to represent another one: % arg1=% 6−c0*Ci.

Referring now to FIG. 2, a dependence graph is depicted illustrating elimination of an overlap edge in accordance with an illustrative embodiment. The nodes in dependence graph 200 correspond to the lines of code in Example Program 2 above.

The goal of live range reduction is to replace the long forward overlap dependence edges 202, 204, 206 with a shorter one via variable substitution. Each overlap dependence edge requires a register. Therefore, each overlap dependence edge that is replaced is one less register that is required. Taking the dependence edge 202 (4-to-6) as an example, based on the code in Example Program 2, node 5 is the only node between nodes 4 and 6. Therefore, a dependence edge from node 5 to node 6 is the only candidate to potentially replace dependence edge 202.

Referring to the following excerpt from Example Program 2:

```
Line04:   %4 = for (%arg6 = Cj) (%arg3 = %arg2) {
Line05:      %2 = LoadAndSend %Memory[%arg3]
Line06:      %3 = %arg3 + 128
Line07:      yield %3
Line08:   }
```

Expression Group 2 above includes the following affine expressions:

$$\% \ arg3 = 128 * \% \ arg6 + c0 * \% \ arg5 + c1 * \% \ arg4$$

$$\%2 = 128 * \% \ arg6 + c0 * \% \ arg5 + c1 * \% \ arg4$$

$$\%3 = 128 * \% \ arg6 + c0 * \% \ arg5 + c1 * \% \ arg4 + 128$$

From the affine expressions in Expression Group 2, an equation can be deduced between % arg3 and % 2:

$$\% \ arg3 = \%2$$

Therefore, % arg3 in line 6 of Example Program 2 can be replaced by % 2 directly. Line 6 then becomes:

$$\%3 = \%2 + 128$$

which produces dependence edge 208 (5-to-6) and eliminates overlap dependence edge 202.

Figure 3:
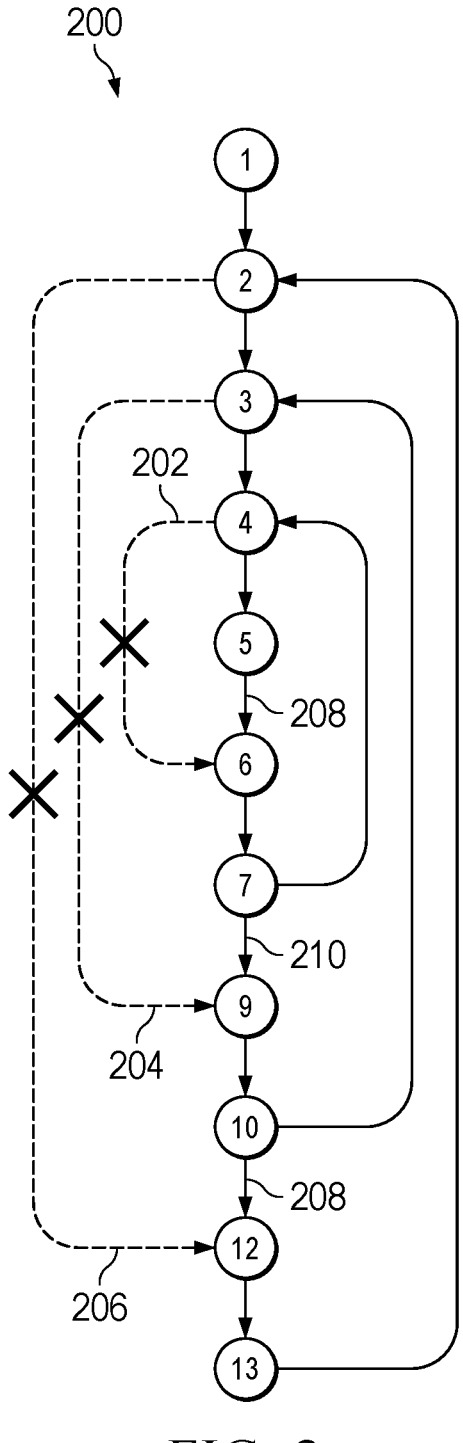
FIG. 3 depicts a dependence graph illustrating additional elimination of overlap edges in accordance with an illustrative embodiment.

Referring now to FIG. 3, a dependence graph is depicted illustrating additional elimination of overlap edges in accordance with an illustrative embodiment. FIG. 3 continues the example shown in FIG. 2, extending the process of live range reduction to overlap dependence edges 204 and 206.

Looking next at dependence edge 204 (3-to-9), there are four nodes between node 3 and node 9, which presents multiple choices to replace dependence edge 204.

Referring to the following excerpt from Example Program 2:

```
Line03:   %6 = for (%arg5 = Ci) (%arg2 = %arg1) {
Line04:      %4 = for (%arg6 = Cj) (%arg3 = %arg2) {
Line05:         %2 = LoadAndSend %Memory[%arg3]
Line06:         %3 = %arg3 + 128
Line07:         yield %3
Line08:      }
Line09:      %5 = %arg2 + c0
Line10:      yield %5
Line11:   }
```

Expression Group 3 above includes the following affine expressions:

$$\%4 = c0 * \% \ arg5 + c1 * \% \ arg4 + 128 * Cj$$

$$\%5 = c0 * \% \ arg5 + c1 * \% \ arg4 + c0$$

$$\% \ arg2 = c0 * \% \ arg5 + c1 * \% \ arg4$$

In a structure control flow like MLIR (Multi-Level Intermediate Representation), values defined in a region do not escape out of the enclosing region. Therefore, % arg3, % 2, and % 3 (Expression Group 2) defined at lines 4, 5, and 6 are not in scope with % 5 at line 9. Therefore, they cannot form dependence edges and be used to replace % arg2 at line 9. % arg2, % 4, % 5 are in the same scope (region), and % 4 dominates % 5. Thus, it is possible to use % 4 to replace % arg2 at line 9.

From the affine expressions in Expression Group 3, it is known that:

$$\% \ arg2 = \%4 − 128 * Cj$$

With this equation, line 9 can be transformed to:

$$\%5 = \%4 + (c0 − 128 * Cj)$$

and dependence edge 204 (3-to-9) can be eliminated by adding new dependence edge 210 (7-to-9).

The same algorithm can be applied to dependence edge 206 (2-to-12), which is replaced by new dependence edge 208 (10-to-12).

After the above transformation, Example Program 2 becomes:

```
Line01: %1 = 0
Line02: for (%arg4 = Ckj) (%arg1 = %1) {
Line03:   %6 = for (%arg5 = Ci) (%arg2 = %arg1) {
```

-continued

```
Line04:    %4 = for (%arg6 = Cj) (%arg3 = %arg2) {
Line05:       %2 = LoadAndSend %arg3
Line06:       %3 = %2 + 128
Line07:       yield %3
Line08:    }
Line09:    %5 = %4 + (c0-128*Cj)
Line10:    yield %5
Line11:    }
Line12:    %7 = %6 + (c1-c0*Ci)
Line13:    yield %7
Line14:}
``` with the changes occurring in lines 6, 9, and 12.

Figure 4:
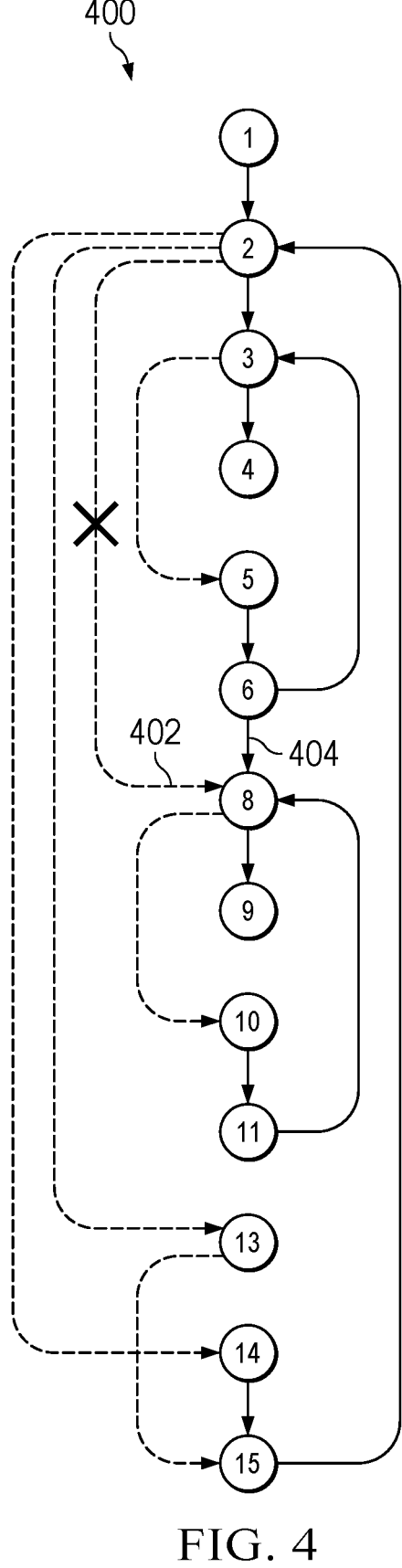
FIG. 4 depicts an example dependence graph illustrating elimination of an overlap edge in accordance with an illustrative embodiment.

FIG. 4 depicts an example dependence graph illustrating elimination of an overlap edge in accordance with an illustrative embodiment. The nodes in dependence graph 400 correspond to the lines of code in Example Program 3 below.

Example Program 3

```
Line01: %0 = 0, %1 = 512
Line02: for (%arg8 = Ci) (%arg3 = %0, %arg4 = %1) {
Line03:    %4 = for (%arg9 = 4) (%arg5 = %arg3) {
Line04:       %2 = LoadAndSend %arg5
Line05:       %3 = %arg5 + 128
Line06:       yield %3
Line07:    }
Line08:    %7 = for (%arg10 = 4) (%arg6 = %arg4) {
Line09:       %5 = LoadAndSend %arg6
Line10:       %6 = %arg6 + 128
Line11:       yield %3
Line12:    }
Line13:    %8 = %arg3 + c0
Line14:    %9 = %arg4 + c0
Line15:    yield %8,%9
Line16:}
```

In this example, there are more overlapping of live ranges than in dependence graph 200. The same method applied above to dependence graph 200 can be applied to dependence graph 400 to reduce live range overlapping between sister loops such as edge 402 (2-to-8).

From the code in Example Program 3, it is known that variables defined between line 3 and line 6 are not in scope with % arg4 for the substitution. The nearest dominant variable of % arg4 with the same expression except constant term is % 4.

The relationship between % arg4 and % 4 is:

$$\% \ arg4 = \%4$$

Therefore, line 8 can be transformed to:

$$\%7 = \text{for } (\% \ arg10 = 4)(\% \ arg6 = \%4)\{$$

and dependence edge 402 (2-to-8) can be eliminated by adding new dependence edge 404 (6-to-8).

The same algorithm can be applied to the remaining overlap dependence edges in dependence graph 400. The resulting transformation of Example Program 3 is:

```
Line01: %0 = 0, %1 = 512
Line02: for (%arg8 = Ci) (%arg3 = %0, %arg4 = %1) {
Line03:    %4 = for (%arg9 = 4) (%arg5 = %arg3) {
Line04:       %2 = LoadAndSend %arg5
Line05:       %3 = %2 + 128
Line06:       yield %3
Line07:    }
Line08:    %7 = for (%arg10 = 4) (%arg6 = %4) {
Line09:       %5 = LoadAndSend %arg6
Line10:       %6 = %5 + 128
Line11:       yield %3
Line12:    }
Line13:    %8 = %7 + (c0 − 1024)
Line14:    %9 = %arg4 + c0
Line15:    yield %8,%9
Line16:}
``` with changes occurring in lines 5, 8, and 10.

Figure 5:
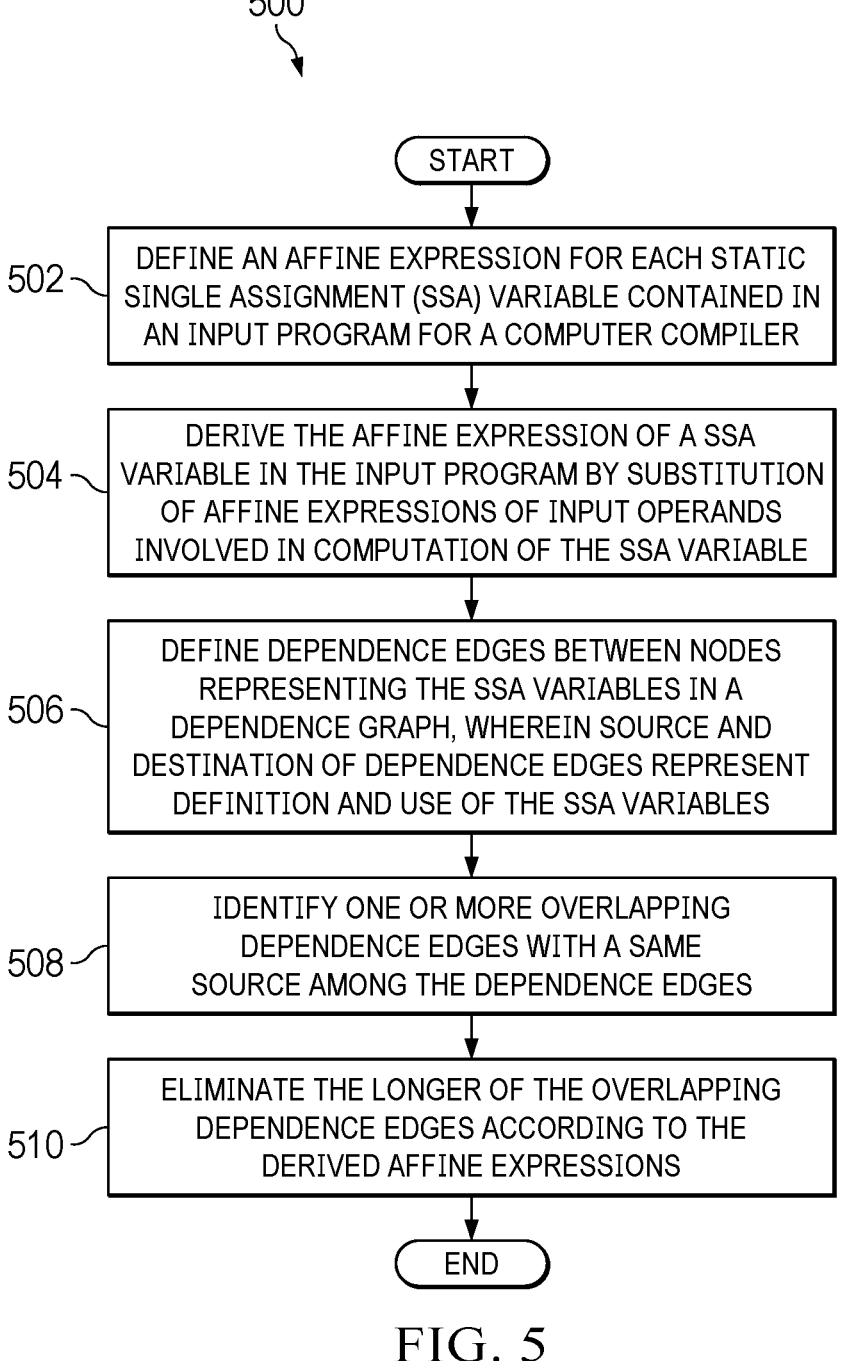
FIG. 5 depicts a flowchart illustrating a process for reducing live range of variables for register allocation of structured control-flow programs in accordance with an illustrative embodiment.

FIG. 5 depicts a flowchart illustrating a process for reducing live range of variables for register allocation of structured control-flow programs in accordance with an illustrative embodiment. Process 500 can be carried out in computing environment 100 in FIG. 1.

Process 500 begins by defining an affine expression for each static single assignment (SSA) variable contained in an input program for a computer compiler (502). The input program might be any program that organizes input of instructions into a computer.

Process 500 derives the affine expression of a SSA variable in the input program by substitution of affine expressions of input operands involved in computation of the SSA variable, thereby propagating the affine expression of the input operands (step 504). The affine expressions may be combined into groups, wherein the affine expressions in each group are the same except for constant terms. For-loop operations represented by affine expressions may comprise static loop bounds or constant offset.

Process 500 defines dependence edges between nodes representing the SSA variables in a dependence graph, wherein source and destination of dependence edges represent definition and use of the SSA variables (step 506).

Process 500 identifies one or more overlapping dependence edges with a same source among the dependence edges (step 508) and eliminates the longer of the overlapping dependence edges according to the derived affine expressions (step 510). Process 500 then ends.

FIG. 6 depicts a flowchart illustrating a process for deriving affine expressions in accordance with an illustrative embodiment. Process 600 is a detailed example of step 504 in FIG. 5.

Process 600 determines whether the SSA variables in the input program are constant (step 602). For each constant SSA variable in the input program process 600 creates an affine expression with the expression values being the constant value of those variables (step 606).

For non-constant SSA variables in the input program, process 600 creates an affine expression with expression value being itself via an identity map (step 604).

Process 600 inserts the constant SSA variables into a queue (step 608). For each SSA variable "v" in the queue, process 600 pops the SSA variable from the queue (step 610) and gets the affine expression of the popped SSA variable (step 612).

For each operation that uses the SSA variable "v", process 600 substitutes the affine expression of the variable "v" in affine expressions of the operation results (step 614) and simplifies the resultant expression linear algebraically (step 616). When the operation involves arithmetic, such as Add, Subtract, or Divide, the affine expression of the operation results can be constructed according to the specific arithmetic involved. In cases where the operation pertains to a loop with operation results, like a for-loop featuring loop-carried variables, each result's affine expression can be formed by summing the affine expression of the initial value of its corresponding loop-carried variable with the product of the number of loop iterations and the constant offset present in each iteration. If the offset is not constant, process 600 considers the result insolvable and proceeds to the subsequent step in the algorithm. If the operation is unfamiliar or undefined, process 600 abstains from substituting the affine expression of the used variable. Instead, it treats the situation as unsolvable.

Responsive to a determination the simplified expression is different from the original expression before substitution (step 618), process 600 inserts the results of the operation into the queue (step 620). Process 600 then ends.

FIG. 7 depicts a flowchart illustrating a process for identifying overlapping dependence edges in accordance with an illustrative embodiment. Process 700 is a detailed example of step 508 in FIG. 5.

For each dependence edge, process 700 traverses the input program for a new SSA variable in reverse preorder starting from the end node of the dependence edge, wherein the new SSA variable is in scope and has a propagated expression as a function of the SSA variable used in the end node of the dependence edge (step 702).

Process 700 then replaces an operand of the end node with the new SSA variable using the affine expression as a function (step 704). Responsive to a determination that multiple SSA variables in reverse preorder could contribute to replacement of the operand, process 700 finds the closest SSA variable based on dominance. Process 700 then ends.

As used herein, a "number of," when used with reference to objects, means one or more objects. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, a "computer instruction," or "computer program", means one step or a set of steps that includes information on how to operate, perform, or maintain particular computer software or hardware. For example, a "computer instruction" can be a computer program instruction in the form of lines of code or source code that are executable by a computer system.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present disclosure have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method of reducing live range of variables for register allocation of structured control-flow programs, the method comprising:

using a number of processors to perform:

defining an affine expression for each static single assignment (SSA) variable contained in an input program for a computer compiler;

deriving the affine expression of an SSA variable in the input program by substitution of affine expressions of input operands involved in computation of the SSA variable;

defining dependence edges between nodes representing the SSA variables in a dependence graph, wherein source and destination of dependence edges represent definition and use of the SSA variables;

identifying one or more overlapping dependence edges with a same source among the dependence edges;

eliminating the longer of the overlapping dependence edges according to the derived affine expressions; and adjusting register allocation for the input program for a computer compiler by reducing a number of registers for the SSA variables contained in the input program based on elimination of the overlapping dependence edges.

2. The method of claim 1, wherein deriving the affine expressions further comprises:

creating an affine expression for each constant SSA variable in the input program with expression values being the constant value of those variables;

for non-constant SSA variables in the input program, creating an affine expression with expression value being itself via an identity map;

inserting the constant SSA variables into a queue;

for each SSA variable "v" in the queue:

popping the SSA variable from the queue;

getting the affine expression of the popped SSA variable;

for each operation that uses the SSA variable "v", substituting the affine expression of the variable "v" in affine expressions of operation results; and simplifying the resultant expression linear algebraically.

3. The method of claim 2, further comprising, responsive to a determination the simplified expression is different from an original expression before substitution, inserting the results of the operation into the queue.

4. The method of claim 2, wherein substituting the affine expression of the variable "v" in affine expressions of the operation results further comprises:

for an operation comprising arithmetic, constructing the affine expression of the operation results according to the specific arithmetic involved.

5. The method of claim 2, wherein substituting the affine expression of the variable "v" in affine expressions of the operation results further comprises:

for an operation comprising a loop with operation results, summing the affine expressions of an initial value of its corresponding loop-carried variable with the product of a number of loop iterations and the constant offset present in each iteration to form the result for each operation.

6. The method of claim 2, wherein substituting the affine expression of the variable "v" in affine expressions of the operation results further comprises:

for an operation that is unfamiliar or undefined, abstaining from substitution of the affine expression of the used variable, wherein the operation is considered unsolvable.

7. The method of claim 1, wherein identifying the one or more overlapping dependence edges further comprises:

for each dependence edge, traversing the input program for a new SSA variable in reverse preorder starting from an end node of the dependence edge, wherein the new SSA variable is in scope and has a propagated expression as a function of the SSA variable used in the end node of the dependence edge; and replacing an operand of the end node with the new SSA variable using the affine expression as a function.

8. The method of claim 1, further comprising combining the affine expressions into groups, wherein the affine expressions in each group are the same except for constant terms.

9. A computer-implemented method of reducing live range of variables for register allocation of structured control-flow programs, the method comprising:

using a number of processors to perform:

defining an affine expression for each static single assignment (SSA) variable contained in an input program for a computer compiler;

substituting affine expressions of input operands involved in computation of the SSA variables into the SSA variables;

removing at least one overlapping dependence edge between nodes representing the SSA variables in a dependence graph according to the substitution of the affine expressions into the SSA variables, wherein each overlapping dependent edge represents a required register in a processor; and adjusting register allocation for the input program for a computer compiler by reducing a number of registers for static single assignment (SSA) variables contained in the input program based on removal of the overlapping dependence edges.

10. The method of claim 9, wherein removing the at least one overlapping dependent edge further comprises:

for each dependence edge, traversing the input program for a new SSA variable in reverse preorder starting from an end node of the dependence edge, wherein the new SSA variable is in scope and has a propagated expression as a function of the SSA variable used in the end node of the dependence edge; and replacing an operand of the end node with the new SSA variable using the affine expression as a function.

11. A computer-implemented method of reducing live range of variables for register allocation of structured control-flow programs, the method comprising:

using a number of processors to perform:

creating an affine expression for each constant static single assignment (SSA) variable in an input program for a computer compiler, wherein expression values are the constant value of those variables;

for non-constant SSA variables in the input program, creating an affine expression with expression value being itself via an identity map;

inserting the constant SSA variables into a queue;

for each SSA variable in the queue:

popping the SSA variable from the queue;

getting the affine expression of the popped SSA variable;

for each operation that uses the SSA variable, substituting the affine expression of the variable in affine expressions of the operation results and simplifying the resultant expression linear algebraically;

responsive to a determination the simplified expression is different from an original expression before substitution, inserting the results of the operation into the queue;

removing at least one overlapping dependence edge between nodes representing the SSA variables in a dependence graph according to the substitution of the affine expressions, wherein each overlapping dependent edge represents a required register in a processor; and adjusting register allocation for the input program for a computer compiler by reducing number of required registers for the SSA variables contained in the input program based on removal of the overlapping dependence edges.

12. The method of claim 11, wherein substituting the affine expression of the variable in affine expressions of the operation results further comprises:

for an operation comprising arithmetic, constructing the affine expression of the operation results according to the specific arithmetic involved;

for an operation comprising a loop with operation results, the result for each operation is formed by summing the affine expressions of the initial value of its corresponding loop-carried variable with the product of a number of loop iterations and the constant offset present in each iteration; and for an operation that is unfamiliar or undefined, abstaining from substitution of the affine expression of the used variable, wherein the operation is considered unsolvable.

13. A system for reducing live range of variables for register allocation of structured control-flow programs, the system comprising:

a storage device that stores program instructions;

one or more processors operably connected to the storage device and configured to execute the program instructions to cause the system to:

define an affine expression for each static single assignment (SSA) variable contained in an input program for a computer compiler;

derive the affine expression of an SSA variable in the input program by substitution of affine expressions of input operands involved in computation of the SSA variable;

define dependence edges between nodes representing the SSA variables in a dependence graph, wherein source and destination of dependence edges represent definition and use of the SSA variables;

identify one or more overlapping dependence edges with a same source among the dependence edges;

eliminate the longer of the overlapping dependence edges according to the derived affine expressions; and adjust register allocation for the input program for a computer compiler by reducing a number of registers for the SSA variables contained in the input program based on elimination of the overlapping dependence edges.

14. The system of claim 13, wherein the program instructions that cause the system to derive the affine expressions further cause the system to:

create an affine expression for each constant SSA variable in the input program with expression values being the constant value of those variables;

for non-constant SSA variables in the input program, create an affine expression with expression value being itself via an identity map;

insert the constant SSA variables into a queue;

for each SSA variable "v" in the queue:

pop the SSA variable from the queue;

get the affine expression of the popped SSA variable;

for each operation that uses the SSA variable "v", substitute the affine expression of the variable "v" in affine expressions of the operation results; and simplify the resultant expression linear algebraically.

15. The system of claim 14, wherein the program instructions further cause the system to, responsive to a determination the simplified expression is different from the original expression before substitution, insert the results of the operation into the queue.

16. The system of claim 14, wherein the program instructions that cause the system to substitute the affine expression of the variable "v" in affine expressions of the operation results further cause the system to:

for an operation comprising arithmetic, construct the affine expression of the operation results according to the specific arithmetic involved.

17. The system of claim 14, wherein the program instructions that cause the system to substitute the affine expression of the variable "v" in affine expressions of the operation results further cause the system to:

for an operation comprising a loop with operation results, sum the affine expressions of the initial value of its corresponding loop-carried variable with the product of a number of loop iterations and the constant offset present in each iteration to form the result for each operation.

18. The system of claim 14, wherein the program instructions that cause the system to substitute the affine expression of the variable "v" in affine expressions of the operation results further cause the system to:

for an operation that is unfamiliar or undefined, abstain from substitution of the affine expression of the used variable, wherein the operation is considered unsolvable.

19. The system of claim 13, wherein the program instructions that cause the system to identify the one or more overlapping dependence edges further cause the system to:

for each dependence edge, traverse the input program for a new SSA variable in reverse preorder starting from an end node of the dependence edge, wherein the new SSA variable is in scope and has a propagated expression as a function of the SSA variable used in the end node of the dependence edge; and replace an operand of the end node with the new SSA variable using the affine expression as a function.

20. The system of claim 13, wherein the program instructions further cause the system to combine the affine expressions into groups, wherein the affine expressions in each group are the same except for constant terms.

21. A computer program product for reducing live range of variables for register allocation of structured control-flow programs, the computer program product comprising:

a persistent storage medium having program instructions configured to cause one or more processors to:

define an affine expression for each static single assignment (SSA) variable contained in an input program for a computer compiler;

derive the affine expression of an SSA variable in the input program by substitution of affine expressions of input operands involved in computation of the SSA variable;

define dependence edges between nodes representing the SSA variables in a dependence graph, wherein source and destination of dependence edges represent definition and use of the SSA variables;

identify one or more overlapping dependence edges with a same source among the dependence edges;

eliminate the longer of the overlapping dependence edges according to the derived affine expressions; and adjust register allocation for the input program for a computer compiler by reducing a number of registers for the SSA variables contained in the input program based on elimination of the overlapping dependence edges.

22. The computer program product of claim 21, wherein the program instructions that cause the system to derive the affine expressions further cause the system to:

create an affine expression for each constant SSA variable in the input program with expression values being the constant value of those variables;

for non-constant SSA variables in the input program, create an affine expression with expression value being itself via an identity map;

insert the constant SSA variables into a queue;

for each SSA variable "v" in the queue:

pop the SSA variable from the queue;

get the affine expression of the popped SSA variable;

for each operation that uses the SSA variable "v", substitute the affine expression of the variable "v" in affine expressions of the operation results; and simplify the resultant expression linear algebraically.

* * * * *